United States Patent [19]

Todd, Jr.

[11] 4,002,683

[45] Jan. 11, 1977

[54] PROCESS FOR ISOMERIZING ALPHA ACIDS TO ISO-ALPHA ACIDS

[75] Inventor: Paul H. Todd, Jr., Kalamazoo, Mich.

[73] Assignee: Kalsec, Inc., Kalamazoo, Mich.

[22] Filed: Jan. 10, 1972

[21] Appl. No.: 216,757

Related U.S. Application Data

[63] Continuation-in-part of Ser. No. 139,849, May 3, 1971, abandoned.

[52] U.S. Cl. .......................................... 260/586 D
[51] Int. Cl.² ........................................ C07C 45/00
[58] Field of Search ................... 260/586 R, 586 D

[56] References Cited

UNITED STATES PATENTS

| | | | |
|---|---|---|---|
| 3,044,879 | 7/1962 | Koch et al. | 260/586 R X |
| 3,418,135 | 12/1968 | Bayne | 260/586 R X |
| 3,686,316 | 8/1972 | Verzele | 260/586 R |

*Primary Examiner*—Norman Morgenstern
*Attorney, Agent, or Firm*—Gordon W. Hueschen

[57] ABSTRACT

The present invention provides a process for transforming an alpha acid into an iso-alpha acid, involving contact of the alpha acid with an aqueous solution of a metal ion, comprising the steps of contacting an aqueous solution of the metal ion with a water-immiscible organic solvent solution of the alpha acid under conditions whereunder the alpha acid is dissolved or remains dissolved in said organic solvent and effecting the desired isomerization in the water-immiscible organic solvent, with or without prior separation of said solvent containing said alpha acid from the aqueous phase.

Numerous advantages accrue to the employment of this process over prior-art procedures. Humulones are readily isomerized to isohumulones, and hop extracts are readily isomerized to "preisomerized" hop extracts. The products have utility as flavoring additives.

21 Claims, No Drawings

PROCESS FOR ISOMERIZING ALPHA ACIDS TO ISO-ALPHA ACIDS

CROSS REFERENCE

This application is a continuation-in-part of application Ser. No. 139,849, filed May 3, 1971 now abandoned.

BACKGROUND OF THE INVENTION

1. Field of Invention

Iso-alpha acids (isohumulones) — isomerization of alpha-acids (humulones) thereto.

2. Prior Art

Hops have been used for centuries for the purpose of influencing microbial flora during fermentation of wort into beer, and for contributing a clean bitter flavor and rich aroma to the beer. As the chemistry of the hop constituents began to be elucidated, it became clear that the most important bittering compounds derived from hops were a group of isomers and analogous compounds, generally known as isohumulones or iso-alpha acids. The iso-alpha acids (isohumulones) are formed from alpha acids (humulones) during boiling of the wort in the traditional brewing process, and have been made in the laboratory and in commercial practice by a number of somewhat similar procedures.

The basic equation for the isomerization is depicted in Table 1, and it is clear that this equation applies to the common forms of alpha acids (cohumulone, adhumulone, and humulone) as well as to reduced form thereof, and other forms in which the ethylenic linkage in the side chain or chains may shift or become hydrated, as well as forms in which the alkyl and/or alkenyl side chains have different lengths or types of branching. In this specification, the terms "alpha acids" and "iso-alpha acids" are used to describe these types of compounds, as the critical portion of their structure as well as their behavior in terms of the basic equation of Table 1 is identical.

While work on elucidation of the structure of these hop bittering substances went forward, progress was also made in the field of hop extraction. Today, hop extracts are used interchangeably with hops by many brewers, and have the distinct advantage of greater uniformity, stability, and ease of storage. Hops may be extracted by any non-reactive solvent, such as methanol, ethanol, acetone, hexane, or lower-boiling chlorinated solvents.

A disadvantage in the use of whole hop extract, shared by the use of whole hops, is the low rate of conversion of alpha acids to iso-alpha acids during boiling of the wort, and the consequent overall low utilization of the hops in the beer. The efficiency with which hops are used when whole or in the form of whole hop extract is generally accepted to be about 30%.

A process for increasing efficiency of whole hops utilization is described in U.S. Pat. No. 3,451,821. This process involves isomerization of the whole hop extract to what is known as preisomerized hop extract, separating the iso-alpha acids therefrom, adding the non-isomerizable portion of the hop extract to the wort during boil (to secure the non iso-alpha acid bittering substances present, as well as to give the wort biological stability), and adding post-fermentation the iso-alpha acids and delicate hop volatile substances normally lost in the course of steam distillation during wort boil. In this way, utilization of the hops can exceed 75%, and at the same time greatly improved control is achieved by the brewer.

One of the drawbacks of known processes for producing a preisomerized hop extract is its cost, as the isomerization adds an expensive step to a relatively simple extraction process. For example, British Patent Specification 1,158,697 published 16 July 1969, shows catalytic isomerization of a 10% solution of hop extract in ethanol, when mixed with about four-tenths part of water, and at an elevated temperature. Such procedure requires the handling of about two pounds of ethanol and eight-tenths pound of water for each pound of hops extracts, and must therefore be carried out in extremely large volume isomerization reactors, e.g., approximately 5-10,000 gallon reactors. It also presents the formidable difficulty of removing the water and alcohol from the hop extract without damaging or losing the delicate aromatic compounds, following isomerization. The present invention eliminates the need for ethanol, or other water miscible co-solvent (coupling agent, as referred to by the British patentee), and permits the same solvent as used in the extraction of the hops, which is a water-immiscible organic solvent, to be used as the isomerizaton medium. Furthermore, according to the present invention, the hop extract may be isomerized in a relatively concentrated form, conveniently up to about 40% concentration in the extracting solvent, thus requiring only one-half to three-fourths pound of solvent per pound of hops for isomerization — the advantage of an about five-fold reduction in volume of equipment required, as well as eliminating the necessity of introducing the previously-necessary water-miscible co-solvent for purposes of isomerization.

Another procedure for isomerizing the alpha acids to the iso-alpha acids is to separate the alpha acids from the hop extract by partitioning into water at selected pH ranges, as is also known to the art, and then to isomerize the alpha acids by heating at a pH of about 10. This eliminates the difficulties of removing water from the non-isomerizable resins which exist in the first procedure mentioned, and does not expose the other hop constituents to the conditions of isomerization, but it does require the additional step of separating the alpha acids, which is relatively difficult because the beta-acids (lupulones) are about as acidic as the alpha acids. This procedure also has the disadvantage of requiring large volumes of water, since the alpha acids are soluble in water only at a level of 1%–2% at the pH which must be used; thus about 4 to 5 pounds of water are required in this isomerization process for each pound of hops extracted. The present invention reduces the required volume capacity of the equipment employed by a factor of up to 10, as well as providing the other advantages to be mentioned in the following.

A further important shortcoming of known processes for desired isomerization of alpha acids to iso-alpha acids is the difficulty of controlling them so that no adverse side-reactions take place, involving either the alpha acids or iso-alpha acids, or other hop constituents. A discussion of known methods of isomerizing alpha acids to iso-alpha acids, and their shortcomings on a practical scale, will contribute to an understanding of the present invention.

As mentioned previously, the conventional method of isomerizing hops or hop extracts is to add them in brewing during boiling of the wort. In some cases, calcium sulfate is added and it is now known that this tends to increase the rate of isomerization if the wort is deficient in hardness. The same reaction occurs when pure alpha acids are boiled in hard water, but the yield is never satisfactory.

One of the earliest methods of isomerization was that reported by Carson, J. Am. Chem. Soc. 74, 4615 (1952), in which he refluxed alpha acids in methanol at a pH of 10. He formed both the typical bitter iso-alpha acids and a non-bitter oil, which has later been explained as being due to spiro compounds formed because of the presence of methanol [Maes et al., J. Inst. Brew. 76, 250 (1970)]. The behavior of ethanol is similar to methanol in this respect.

Another and more satisfactory method for effecting the desired isomerization is to heat an aqueous solution of alpha acids, or mixture of alpha acids and other hop resins, at a pH of 9.5 to 11.0 until the isomerization is complete. The difficulty of separating the alpha acids from the beta acids (in such type procedure) is already referred to above, as applied to commercial practice, and the other disadvantage is the difficulty of stopping the reaction before iso-alpha acids are hydrolyzed to undesired humulinic acid, which is non-bitter.

An improved method for the desired isomerization is reported in British Patent Specification 1,158,697. In this method, isomerization of the alpha acids is accelerated as a result of the presence of a polyvalent metal ion. Although this patent specification shows how to control the formation of humulinic acid by using a reduced reaction time and lower pH than employed in the alkaline isomerization, it does subject the hop constituents to an elevated temperature and to a water-miscible co-solvent, ethanol, which exposes the iso-alpha acids to conversion to Carson's non-bitter material. Although under the conditions described in the patent this may not form, it represents a significant hazard under commercial conditions in which heating and cooling times are and must be much longer. In addition, unless the ethanol can in some way be completely removed from the finished isomerized hop extract, it will form esters with acids present in the extract, and these affect the flavor of the beer as they are not uniformly metabolized by the yeast.

Thus it is seen that, in presently-known forms, all prior-art processes for converting a whole hop extract into a preisomerized hop extract, or for converting alpha acids into iso-alpha acids, have the following shortcomings:

1. They produce undesirable by-products, either tasteless or off-taste, unless very closely controlled.
2. They require large volume equipment and large volumes of solvent per unit of hops processed.
3. They require steps for solvent removal (and water removal) which are not required in producing whole hop extract.
4. They require elevated temperatures which expose the hop constituents, especially the alpha, iso-alpha, and beta acids, to oxidative reactions and hydrolysis to the non-bitter humulinic acid.

SUMMARY OF THE INVENTION AND OBJECTS

It has now been found that the shortcomings of the prior art can be overcome by conducting the isomerization of alpha acids to iso-alpha acids in a water-immiscible solvent, at temperatures which can be well below 50° C., and which are usually below 45° C., ordinarily at ambient or room temperatures. Since the prior art expertise has considered it necessary to dissolve the alpha acids in water, or in water and a co-solvent (or "coupling agent") such as ethanol, and elevate the temperature to 80° to 100° C. in order to achieve the desired isomerization, the process of the present invention is indeed a radical and highly advantageous departure from the prior art, especially since it can be conducted in line with conventional hop extraction processes.

It is an object of the present invention to provide a process for transforming an alpha acid into an iso-alpha acid, involving contact of the alpha acid with an aqueous solution of a metal ion, comprising the steps of contacting an aqueous solution of the metal ion with a water-immiscible organic solvent solution of the alpha acid under conditions whereunder the alpha acid is dissolved or remains dissolved in said organic solvent and effecting the desired isomerization in the water-immiscible organic solvent with or without prior separation of said solvent containing said alpha acid from the aqueous phase, having numerous advantages over the prior art as herein elsewhere set forth. It is an additional object to provide such an advantageous process wherein, individually or in combination, the solvent is selected from the class consisting of methylene chloride, ethylene dichloride, dichloroethane, trichloroethylene, and chloroform; the temperature is below 50° C.; the pH is maintained below that at which a significant portion of the alpha acid is present in any water phase under the conditions of the reaction; the pH of any water phase is above 8.0 and preferably 13 or below and the temperature is below 50° C.; a metal ion selected from the group consisting of calcium and magnesium ions is present; calcium ion is present; hops are extracted with a water-immiscible organic solvent and the said isomerization effected prior to removal of all organic solvent from the product; metal ions are introduced into the said hop extract while the solvent is present, the mixture held until isomerization occurs, and the solvent removed; metal ions are removed by washing the said hop extract contained in the solvent with dilute acid prior to removal of the solvent; the said mixture is held at a temperature below 50° C. until isomerization occurs; and extracted alpha acids are separated from other hop resins, redissolved in the said water-immiscible organic solvent, and subjected to the isomerization. Other objects will become apparent hereinafter and still others will be obvious to one skilled in the art.

DETAILED DESCRIPTION OF THE INVENTION

The following Examples are given by way of illustration only.

The following example will describe the basic principle of this invention

EXAMPLE 1

Isomerization of alpha acids in a water-immiscible solvent.

One gram ($2.76 \times 10^{-3}$ moles) of alpha acids was dissolved in 10 ml. of ethylene dichloride, and 5 ml. of water added. The pH was raised to 11.4, and the alpha acids present in the water phase driven into the water-immiscible solvent by the addition of 1 gm. sodium chloride. This did not affect the pH. The ethylene dichloride solution of alpha acids was separated. A portion of this solution was brought to reflux, and the isomerization was complete in one and one-half hours. Another portion of the solution was left overnight at room temperature, during which time the alpha acids isomerized to iso-alpha acids. The ethylene dichloride solution was washed twice with dilute hydrochloric acid and then removed under vacuum. (Other dilute mineral acids may replace the hydrochloric acid, e.g., sulfuric or phosphoric.) Recovery of iso-alpha acids was quantitative. Humulinic acid was not formed in measurable amounts in either case.

In a similar experiment where water was not separated, the same results were obtained as expected, inasmuch as the alpha acid is not present in the water (according to this invention).

According to prior art procedures, if ethylene dichloride or other water-immiscible solvent had been present, the operator would have deliberately dissolved the alpha acids in the water at a pH of 9 or above, and the isomerization would have been effected in the aqueous medium. This has the disadvantage that humulinic acids, which are not-bitter, are formed, as well as other substantial disadvantages which will become apparent from the discussion which follows:

Although sodium chloride was used in this Example to "salt" out the alpha acids into the water-immiscible solvent at an elevated pH, sodium or potassium chloride, sulfate, carbonate, etc., are equally useful. Calcium chloride and other salts of polyvalent metal ions, such as magnesium chloride, are more effective, because they make alpha acids partition into the water-immiscible solvent at lower metal ion concentrations. They also tend to reduce the time required for isomerization to take place. The use of polyvalent metal ions, and particularly calcium because of its non-toxicity and natural occurrence in beverages, is the preferred embodiment of this invention. Salts of other metals of groups IIA and IIB of the Periodic Table may also be used, as well as salts of iron, cerium, or manganese, including magnesium, cadmium, nickel, and barium. The use of calcium chloride as the metal salt is preferred over other metal salts, since calcium ion is normally added during the brewing process anyway, and the amounts which can be added if the ion remains in the isomerized extract would not affect the beer in a measurable way. In addition, calcium chloride is readily available and very inexpensive, and the reaction proceeds at ambient temperatures in practical periods of time when it is employed.

The further applicability of this basic process is portrayed by the following example:

EXAMPLE 2

Continuous extraction and isomerizaton of hops.

Hops are extracted in a conventional manner using methylene chloride, and the miscella is concentrated to its normal level (10% – 40%) in the given processing operation by a flash evaporator, or by other means. 100 ml. of the extract plus solvent is stirred with between 20 and 100 ml. of 5% calcium chloride solution and the pH raised with sodium hydroxide to between 11.0 and 11.6. The methylene chloride solution of extract is separated into a flask, which is allowed to sit overnight at ambient temperature (25° C.) while the isomerization takes place. The solution is brought to a pH of 5 to 7 by the addition of 0.5% mineral acid with stirring, the methylene chloride extract is separated from the water and transferred to a distillation vessel, and the solvent removed under vacuum. Analysis of the preisomerized extract by thin-layer chromatography shows that no alpha-acid remains, and that it has been replaced by iso-alpha acid.

As would be expected, when magnesium is substituted for calcium chloride, the isomerizaton proceeds more rapidly.

EXAMPLE 2A

Use of Magnesium Chloride

The Experiment of Example 2 was repeated exactly, except that 50 ml. of a 5% magnesium chloride solution was used in place of 50 ml. of calcium chloride solution. At room temperature, the isomerization was complete in five hours.

Chart 1 shows the type of simplification in the process flow chart which results from this discovery that the isomerization can be conducted in a water-immiscible solvent. It is obvious to one familiar with chemical processing that this represents a substantial reduction in the cost of manufacturing of the preisomerized extract, and a drastic simplification of control and supervisory procedures. Other variations in the conventional process are known, and process engineers will be aware of other modifications of the basic process flow depicted in Chart 1. The relative simplification and advantages will always remain.

The invention is equally applicable to the isomerization of reduced alpha acids, as shown in Example 3.

EXAMPLE 3

Isomerization of tetrahydro alpha acids.

Tetrahydro alpha acids are prepared from lupulone by procedures known to the art, as in U.S. Pat. No. 3,552,975.

A 10% solution of the tetrahydro alpha acids in methylene chloride is stirred with approximately 0.5 mole of calcium ion per mole of alpha acid provided by calcium chloride dissolved in water and the pH raised to 11.0. The solution is allowed to stand overnight, and in the morning the pH is reduced to 1.5 to 2.5, the water separated, and the methylene chloride washed twice more with water at a pH of 1.5 to 2.5 to remove metal ions. The methylene chloride is evaporated from the tetrahydro iso-alpha acids, which are recovered in yields of 94% to 98%. Similar results are obtained with concentrations of alpha acids up to about 40% in ethylene dichloride, but at the higher concentrations viscosity problems commence to be encountered.

The foregoing example also shows that water does not interfere with the reaction. If the temperature is above thirty degrees, it is helpful to have water present as it covers the methylene chloride and prevents the air from coming into contact with the alpha acids. Therefore, if it is easier to conduct the isomerization with a water phase present, it is appropriate to do so; if the process equipment is better adaptable to separating the water prior to isomerization, this may be done. When a water phase is present, the pH should be such that no substantial amount of the alpha acid is in the water phase. Insignificant amounts are present in the aqueous phase at a ph of 13 or below; a pH of 8–12 is preferred.

As would be expected, the isomerization progresses more rapidly, the higher the temperature. If a methylene chloride solution of pure alpha acids (humulone, cohumulone, adhumulone, or mixtures thereof) is agitated in the presence of approximately 0.5 mole of calcium ion per mole of alpha acid at a pH of 11.4, and the temperature is 10° C., the reaction takes about 13 hours. At 25° C., it takes 3 hours, and at the reflux temperature of methylene chloride (40° C.), it takes about 20 minutes. If ethylene dichloride is substituted for methylene chloride, the time is cut 30% to 50% at the same temperature. If hexane is used as the water-immiscible solvent, the reaction proceeds even faster, but since hexane is flammable and is a poor solvent for iso-alpha acids, it is not the solvent of choice for commercial practice.

Likewise, the higher the pH, the more rapid the reaction, and because of the inhibiting effect of the water-immiscible solvent on adverse reactions, a pH higher than those previously reported may be used. In any event, pH control is not as critical as in the prior art.

Likewise, any amount of calcium ion may be used, although preferably at least about one-half mole of calcium or other metal ion per mole of alpha acid is present.

It should be pointed out that the rate of reaction is more rapid than that achieved by the prior art using single-phase aqueous systems, and that the amount of metal ion needed is substantially less, as the following example will show. This implies an unexpected but not completely understood catalytic synergistic effect of the water-immiscible solvent, which should be of substantial interest to those studying the mechanism of the reaction.

EXAMPLE 4

Isomerizaton under elevated temperatures using single- and two-phase systems.

A pure sample of humulone was prepared by recrystallizing its orthophenylene diamine complex.

A. PRESENT INVENTION:

4.00 gms. ($1.1 \times 10^{-2}$ moles) of the humulone was made up to 20 ml. with ethylene dichloride (to form a 20% solution) and 5 ml. of water containing 0.97 gm. ($6.6 \times 10^{-3}$ moles) of calcium chloride (0.6 moles of calcium ion per mole of humulone) was added. The pH was raised to 11.4 by the addition of a 1N NaOH solution, and the two-phase mixture in which less than 0.2% of the humulone was in the water phase brought quickly to reflux. In twenty minutes the humulone had isomerized completely to isohumulone.

The same experiment was repeated at room temperature. The isomerization was complete in less than 3 hours.

Both experiments were repeated, except that the water was separated from the solvent containing the humulone. The times required for complete isomerization were the same.

When the experiment was repeated at room temperature, but the pH of the water phase raised only to 10, the isomerization was complete on standing at room temperature overnight.

B. COMPARATIVE: BRITISH SPECIFICATION 1,158,697 (Preferred Conditions)

1.00 gm. ($2.76 \times 10^{-3}$ moles) of humulone was dissolved in 33 ml. of ethanol (to form a 3% solution) and 13 ml. of water containing 1.22 gms. of calcium chloride ($8.3 \times 10^{-3}$ moles) in accordance with the prior art. The solution was adjusted to a pH of 8.0 and brought quickly to reflux (80° C.). The isomerization was complete after five hours.

The same experiment was repeated, except that the solution was kept at room temperature. The isomerization was about 50% complete after 72 hours.

The same experiment was repeated, but 100 ml. of water was substituted for the ethanol and the pH raised to 11.4 to accelerate the isomerization. The isomerization was about two/thirds complete after 18 hours at room temperature and about 50% complete after two hours at reflux temperature.

The isohumulone formed by the procedures in Examples 4A and 4B was analyzed for hydrolysis to humulinic acids, which are undesirable byproducts of the isomerization reaction because they are not bitter. Humulinic acids were not found in significant amounts in product produced using a water-immiscible solvent, or in the procedure of Example 4B substituting magnesium ion for calcium ion (because the isomerization times were shorter), but were found in particularly significant amounts in the single-phase solutions containing water and refluxed for extended periods of time, particularly at pHs above 10. The water-immiscible solvent (even in the presence of a water phase) thus inhibits the formation of humulinic acids, especially at elevated temperatures and pHs.

It should be pointed out that if magnesium had been substituted for calcium, the reaction would have been accelerated. However in commercial practice, ordinary calcium chloride is cheaper to use and the residual ions are of no consequence to the brewer or other user. Calcium thus has an advantage over other polyvalent ions known to be effective in increasing the rate of isomerization because of its non-toxicity and low cost.

Example 4 clearly demonstrates the following advantages of the present invention over the prior art 1. The reaction proceeds more rapidly at room temperature than comparable prior art procedures proceed at elevated temperature.
2. Formation of humulinic acid is prevented.
3. Smaller volumes of solvent and water can be used.
4. Process problems of raising and lowering temperature are avoided.
5. The pH is not critical.
6. Elevated temperature is not necessary, as is taught by the prior art.

The isomerization under the conditions of Example 4B is also disadvantageous because of the prolonged exposure of the iso-alpha acids to ethanol at elevated temperature. To reduce this time exposure, magnesium ion could be used, for example, but this has the disadvantages mentioned for commercial practice. In either case, using elevated temperatures as taught and required by the prior art is cumbersome. For example, 10,000 pounds of hops contain about 800 pounds of alpha acid. Under conditions of the prior art, this amount of alpha acid would involve the use of 8,000 pounds to 80,000 pounds of water for isomerization. This invention obviates the need to raise this tremendous amount of solvent to an elevated temperature, as well as reduces the needed amount of solvent to about 5,000 pounds, considering only the alpha acid.

It should be emphasized that the foregoing examples show the manner in which the invention can best be adapted to present processing techniques, where it will provide the greatest commercial advantage. Other variations of isomerization in a water-immiscible solvent are not to be excluded from the scope of this invention, however.

For example, if as in Example 1 an aqueous solution of alpha acid is stirred with ethylene dichloride, the pH brought to nine or above, and the alpha acid transferred to the water-immiscible solvent by the addition of salt, isomerization occurs with the suppression of unfavorable side reactions, and in the absence of a water phase.

As another example, a fatty acid salt, such as calcium stearate, may be dissolved in the water-immiscible solvent, the pH adjusted, and the isomerization effected. Although, when the preisomerized extract is to be used for flavoring, this technique has the clear disadvantage of introducing fatty acid into the beverage, when the extract is to be used for non-flavoring purposes, it is utilizable and may have advantages.

Although calcium has been disclosed as the preferred example of a metal ion to be employed in this invention, from the standpoint of reaction rate it should be pointed out that magnesium is much faster, and the other ions known to the art also behave with the expected rate relative to calcium under the conditions of this invention. Calcium is preferred for product to be used in beverage because residues in the preisomerized extract neither affect the fermentation or flavor of the beverage, and is inexpensive. Indeed, one form of this invention (see Example 1) involves removal of solvent from the preisomerized extract with the metal ion present, which further simplifies the flow of the improved process depicted in Chart 1 (it eliminates the need for removal of the metal ion by acid washing in Step 2).

Besides methylene chloride and ethylene dichloride, other preferred organic solvents are chloroform, dichloroethane, and trichloroethylene. Higher boiling chlorinated organic solvents may be used, but are more difficult to separate from the end-product. Likewise, hexane, heptane, benzene, esters, or other substantially water-insoluble organic solvent may also be used, but each has its own peculiar disadvantage in present commercial practice because of the relatively low solubility of iso-alpha acids and other hop resins therein, or because of its toxicity or cost. An organic solvent which is heavier than water is ideal, because it is then possible to use a water layer to prevent exposure to air, and thus avoid the hazard of oxidation.

The invention also simplifies the production of pure iso-alpha acids from hop resins, as will be apparent to those skilled in the art. There are different ways of accomplishing this end, but one of the most preferred ways is to separate alpha acids from the hop resin by counter-current extraction as disclosed in U.S. Pat. No. 3,298,835 or Canadian Patent 619,563, followed by subsequent isomerization of the alpha acids in hot alkali, or according to the other procedures known to the art. The present invention is equally advantageous under these conditions, offering substantial quality, yield, and cost improvements as the following example will show.

EXAMPLE 5

Isomerization of substantially pure alpha acids.

A hexane extract of hops is extracted counter-currently with a buffered aqueous or aqueous-alcohol phase, in accord with procedure known to the art (See above references). The alpha acid is recovered substantially free of other hop residue and dissolved in a water-immiscible solvent such as methylene chloride, a 10% salt or calcium chloride solution in water is added to drive the alpha acid into the methylene chloride, the pH raised to between 9 and 12, preferably about 10, and the alpha acid isomerized at room temperature. The iso-alpha acid is recovered and, if desired, further purified by molecular distillation (which separates it from polyphenols which have not been separated from the alpha acid in the counter-current extraction procedure), or by other procedure known to the art.

The hexane or other water-immiscible phase, recovered from the counter-current extraction of the alpha acids from the non-isomerizable resins, is separated into its volatile and non-volatile portions by removal of the solvent to a level below 30 parts per million, and the non-volatile, non-isomerizable fraction of the resin recovered. This portion may then be added to the wort at the boil stage, as in the prior art procedure disclosed in U.S. Pat. No. 3,451,821.

It should be specifically noted that widely varying temperatures have been used in the foregoing examples, ranging from 10° C. to the boiling point of water. Contrary to the prior art, this invention teaches that an elevated temperature and control of temperature is not necessary, and that the isomerization may conveniently be run at ambient temperatures. These are important features in commercial processing. Because of the ease of carrying out the reaction at low temperatures, as possible according to this invention, it is clear that the preferred embodiment is to perform the isomerization at temperatures below about 40°–45° C.

Likewise, the foregoing examples demonstrate the broad range of pH which is suitable for conducting the reaction. This, too, is important in commercial processing, as it is difficult to adjust pH to a narrow range in commercial practice. A pH range of 9 to 12 is a preferred embodiment of this invention, even though the isomerization may be conducted at a pH between 7 and 13.

Separation of the water-immiscible solvent from the isomerized hop resin or pure iso-alpha acid is carried out in a manner consistent with present practice, which preferably removes the last portion of solvent under high vacuum and moderate temperature (See Example 1). The iso-alpha acids prepared by this process have the same tendency to oxidize that any iso-alpha acid has, and usual precautions, such as employment of cooling and an inert atmosphere, must be taken during storage, as is conventional in the art.

Consequently, in short, the method of the invention for converting alpha acids to iso-alpha acids has the following distinct advantages over the prior art.

- It eliminates the need to remove the solvent from the extract prior to isomerization.
- It permits continuous processing of the hops, from extraction to isomerization to solvent removal, without intermediate heating and cooling of the solvent.
- It permits the isomerization to be conducted at an increased rate, under conditions which eliminate the hazard of oxidation, hydrolysis, and further isomerization of the iso-alpha acids.
- It eliminates the necessity for carefully controlled amounts of reagents which, combined with mild conditions, makes the reaction foolproof.
- It greatly reduces the size and volume of equipment required to process a given quantity of hops, because the concentration of extract in the water-immiscible solvent is not critical, and may in the process of this invention be very high.

It can be an integral part of a procedure for producing pure iso-alpha acids.

It eliminates the hazards associated with the two conventional procedures:

A. Formation of a non-bitter "spiro-isohumulone" due to presence of a water co-solvent such as methanol and ethanol.

B. Degradation of alpha and iso-alpha acids due to heating at elevated temperatures in alkaline solution [Clarke et al., J. Inst. Brew. 73, 282 (1967)].

As can be seen from Chart 1, the present invention requires addition of no more than two steps to the basic extraction and solvent removal procedure for obtaining whole hop extract, in order to transform the whole hop extract into pre-isomerized extract, whereas conventional prior art processing adds eight steps, or four times as many.

It is to be understood that the invention is not be be limited to the exact details of operation or exact compounds, compositions, methods, or procedures shown and described, as obvious modifications and equivalents will be apparent to one skilled in the art.

It will be apparent to one skilled in the art from the foregoing disclosure that, regardless of whether the starting alpha acid is present in aqueous solution or in water-immiscible organic solvent solution at the start of the present isomerization process, the alpha acid will partition itself into the water-immiscible organic solvent so that in either case the contact will be between the aqueous solution of the metal ion and a water-immiscible organic solvent solution of the alpha acid and that the isomerization of the alpha acid will occur in the water-immiscible solvent.

TABLE 1

BASIC ISOMERIZATION EQUATION

R', R'', R''' = same or different alkyl and/or alkenyl groups, or such hydrated groups

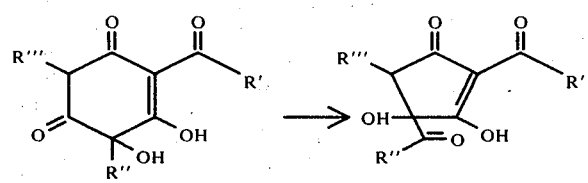

Alpha Acids          Iso-alpha Acids e.g., in the formulas below, $R = -CH_2-CH(CH_3)_2$ = humulone $-CH(CH_3)CH_2CH_3$ = adhumulone $-CH(CH_3)_2$ = cohumulone

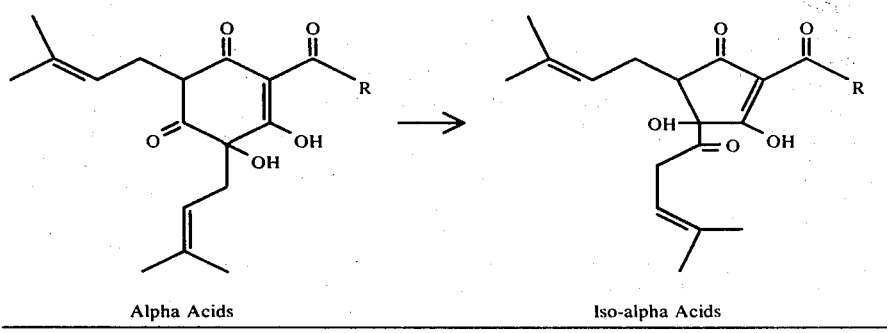

Alpha Acids          Iso-alpha Acids

CHART 1

PROCESS FLOW CHART

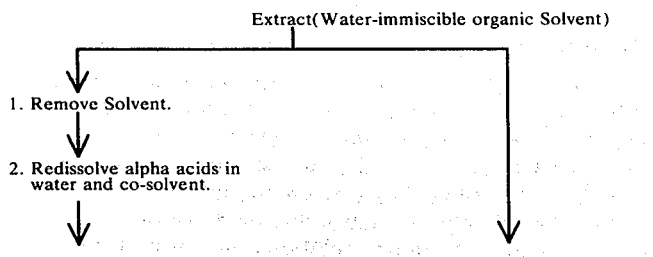

CHART 1-continued
PROCESS FLOW CHART

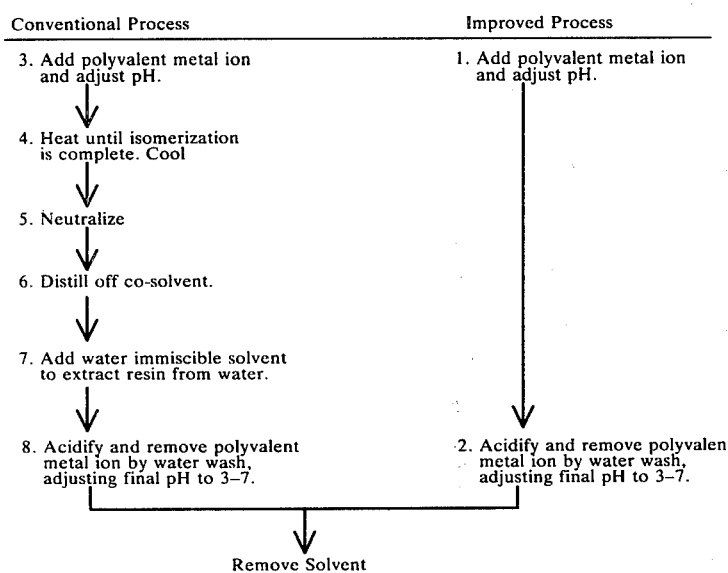

I claim:

1. In a process for transforming an alpha acid into an iso-alpha acid involving contact of the alpha acid with an aqueous solution of a metal salt, the improvement which comprises employing a water-immiscible organic solvent, employing sufficient metal salt to drive or maintain the alpha acid into or in the water-immiscible organic solvent, the pH being maintained at 13 or below, and effecting the desired isomerization in the water-immiscible organic solvent.

2. Process of claim 1 wherein the solvent is selected from the class consisting of methylene chloride, ethylene dichloride, dichloroethane, trichloroethylene, and chloroform.

3. Process of claim 1 wherein the temperature is below 50° C.

4. Process of claim 1 wherein the pH is maintained below that at which a significant portion of the alpha acid is present in any water phase under the conditions of the reaction.

5. Process of claim 4 wherein the pH of any water phase is above 8.0 and the temperature is below 50° C.

6. Process of claim 1 wherein a metal ion selected from the group consisting of calcium and magnesium ions is present.

7. Process of claim 6 wherein calcium ion is present.

8. Process of claim 1 wherein hops are extracted with a water-immiscible organic solvent to separate the alpha acids into the water-immiscible organic solvent and the isomerization effected prior to removal of all organic solvent from the product.

9. Process of claim 8 wherein metal ions are introduced into the hop extract while the solvent is present, the mixture held until isomerization occurs, and the solvent removed.

10. Process of claim 9 wherein metal ions are removed by washing the extract contained in the solvent with dilute acid prior to removal of the solvent.

11. Process of claim 9 wherein the mixture is held at a temperature below 50° C. until isomerization occurs.

12. Process of claim 8 wherein the extracted alpha acids are separated from other extracted materials, redissolved in the water-immiscible solvent, and subjected to the isomerization.

13. Process of claim 1 wherin at least about one-half mole of metal ion is present per mole of alpha acid.

14. Process of claim 8 wherein at least about one-half mole of metal ion is present per mole of alpha acid.

15. Process of claim 1 wherein the metal ion is selected from the group consisting of sodium, potassium, manganese, iron, nickel cerium and Group II A and II B elements of the Periodic Table.

16. Process of claim 1 wherein the pH is between about 7 and 13.

17. Process of claim 1 wherein the temperature is up to about the reflux temperature of the solvent employed.

18. Process of claim 1 wherein the temperature is up to about 100° C.

19. Process of claim 1 wherin the starting alpha acid is isolated.

20. Process of claim 1 wherein the starting alpha acid is in the form of a water-immiscible organic solvent extract.

21. Process of claim 1 wherein a water-immiscible organic solvent, an aqueous solution of a metal ion, and the starting alpha acid are present, and wherein the conditions of the reaction are such that the alpha acid is or remains dissolved in the water-immiscible organic solvent.

* * * * *